Dec. 16, 1952 W. A. SCOTT 2,621,459
CONVERTIBLE DISK HARROW
Filed Aug. 29, 1949 2 SHEETS—SHEET 2
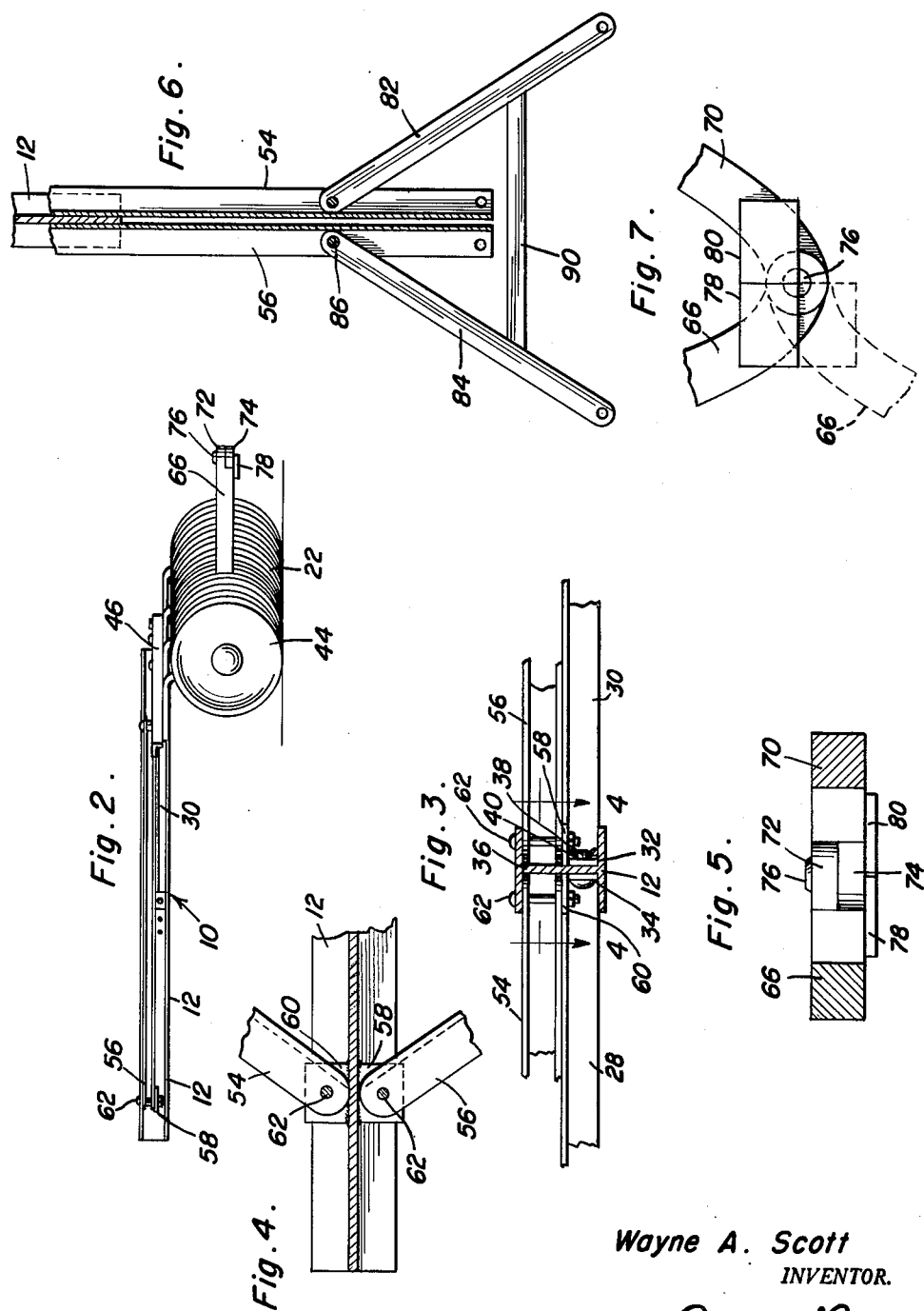
Wayne A. Scott
INVENTOR.

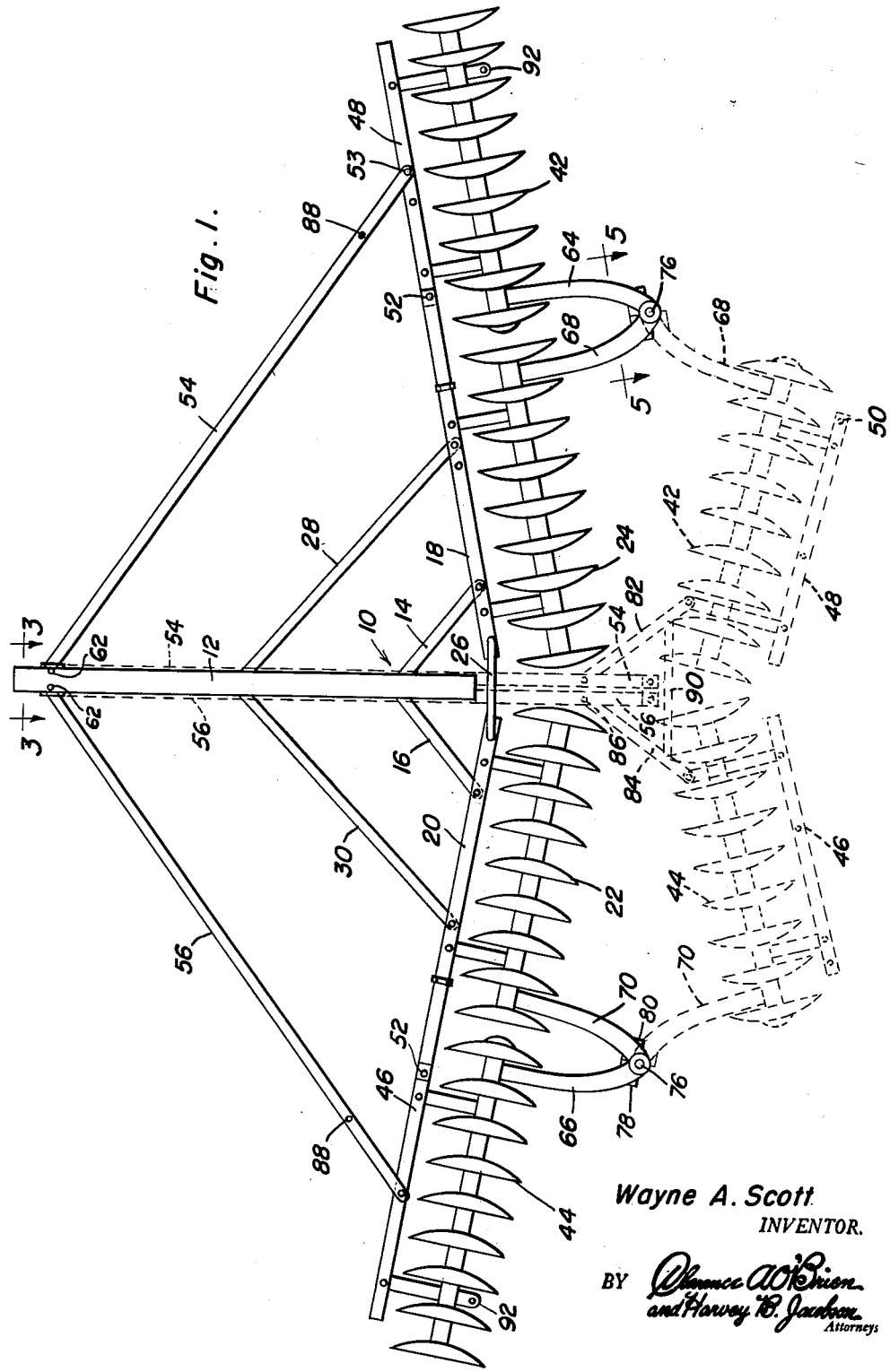

Patented Dec. 16, 1952

2,621,459

UNITED STATES PATENT OFFICE 2,621,459

CONVERTIBLE DISK HARROW

Wayne A. Scott, Saunemin, Ill.

Application August 29, 1949, Serial No. 113,000

2 Claims. (Cl. 55—81)

1

This invention relates to disc harrows and has for its primary object to provide a sectionally constructed harrow, having pivotally connected disc gangs, so that the width of the harrow can be changed.

Another important object of this invention is to pivot a pair of outer disc gangs to a pair of inner disc gangs, so that the outer gang can be secured and aligned with the inner gang for a wide type disc harrow or pivoted on vertical axis about the inner gangs and secured in tandem relation with the inner gangs to provide a narrow centrally weighted type disc harrow.

These and ancillary objects and structural features of merit are attained by this invention, a preferred embodiment of which is set forth in the following description and illustrated in the accompanying drawings, wherein:

Figure 1 is a plan view of the harrow, illustrating the outer gangs in their various positions, with respect to the inner gangs;

Figure 2 is a side elevational view;

Figure 3 is a transverse sectional view taken on line 3—3 of Figure 1;

Figure 4 is a cross sectional view taken on line 4—4 of Figure 3;

Figure 5 is a fragmentary sectional view taken on line 5—5 of Figure 1;

Figure 6 is a top plan view of the brace means for securing the outer gangs in relation to the inner gangs; and, Figure 7 is a fragmentary bottom plan view of the complementary stop means carried by the pivotal supporting arms for the outer disc gangs.

In the accompanying drawings, the disc harrow 10 includes a draft member or eye beam 12. A pair of short brace arms 14 and 16 diverge outwardly and rearwardly from the rear end of the draft member and are pivotally connected at their outer ends to the frames 18 and 20 of a pair of inner disc gangs 22 and 24, the disc gangs being connected together by a connecting rod 26 secured between the inner ends of the frames. The inner gangs 22 and 24 are transversely positioned with respect to the longitudinal axis of the draft member and are inclined forwardly. The outer ends of the inner gangs are supported forwardly of the inner ends by means of brace bars 28 and 30 which are pivotally attached to the frames of the gangs and are formed at their opposing ends with apertured lateral flanges or flat ends 32 and 34. The ends 32 and 34 are positioned against the opposing surfaces of the connecting web 36 of the eye beam or frame member and a bolt 38 is transversely disposed

2 therethrough and secured therein by cotter pins 40 or similar securing means.

A pair of outer disc gangs 42 and 44 are provided and are formed with frames 46 and 48. The outer gangs are pivotally carried at their inner ends by the outer ends of the inner disc gangs and are adapted to be positioned in alignment therewith and transversely positioned with respect to the draft member. In this respect, the frames 46 and 48 are vertically apertured at their inner ends, as at 50, the inner ends of the frames underlying the outer ends of the frames 18 and 20 and being secured thereto by vertical pins 52. Elongated brace bars 54 and 56 are pivotally secured to the eye beam or frame member 12 at their forward ends. In this respect, apertured supporting plates 58 and 60 are welded to the web 36 of the eye beam and the forward ends of the brace bars 54 and 56 are seated thereon and pivotally attached thereto by vertical pivot pins 62.

The outer disc gangs 42 and 44 are formed with arms 64 and 66 which project rearwardly therefrom and are integrally formed with the shafts for the disc. Complementary arms 68 and 70 project rearwardly from the outer ends of the inner disc gangs, the arms 64 and 66 terminating at their outer ends in an upper extending tongue 72 and the arms 68 and 70 terminate in a lower projecting tongue 74. The tongues 72 and 74 are disposed in overlapping relation and are pivotally connected together by means of vertical pivot pins 76. Complementary stop plates 78 and 80 are formed on the under side of the arms 66 and 70 and similarly on the arms 68 and 64, and stop plates being rectangular and limiting the pivotal movement of the arms, as seen in Figure 7.

It can be seen that the outer gangs are held in a transversely disposed relation with the draft member and in axial alignment with the inner gangs by means of the brace bars 54 and 56 and the connecting pins 52, which secure the inner ends of the frames of the outer gangs to the frames of the inner gangs. However, the disc harrow can be converted into a narrow harrow by removing the pins 52 and the pins 53 which secure the inner ends of the bars 54 and 56 to the frames. The outer disc gangs can then be swung about the vertical axis of the vertical pin 76 into dotted line position shown in Figure 1, so that the gangs are in tandem relation with the inner gangs.

The brace bars 54 and 56 are pivoted inwardly about the pivot pins 62, so that the bars extend within the eye beam, as seen in Figure 6, the ends of the bars projecting beyond the end of the eye beam.

Means is provided for securing the outer gangs in tandem relation with the inner gangs and comprises a pair of brace bars 82 and 84 which have their forward ends detachably connected by pins 86 to the brace bars 54 and 56. The pins 86 are disposed through the vertical openings 88 formed in the brace bars 54 and 56. A connecting bar 90 connects the brace bars 82 and 84 together and prevents outward movement thereof about the pins 86. The rear end of the brace bars are secured to the transverse bars 92 of the disc gang frames.

Thus, it can be seen that the brace bars 54 and 56 not only support the outer gangs when the gangs are in axial alignment with the inner gangs but also when the outer gangs are in tandem relation with the inner gangs. To convert the disc harrow into a wide type or narrow type requires but a minimum of time and does not entail the use of any tools, inasmuch as only the pins 52 and 53 need be removed and the outer gangs then swung rearwardly and inwardly, and, at the same time, the brace bars 54 and 56 are swung inwardly and the bars 82 and 84 are connected between the brace bars 54 and 56 and the frames for the outer gangs. Of course, the same connecting pins 52 and 53 are employed.

However, since many other modifications and purposes of this invention will become readily apparent to those skilled in the art upon a perusal of the foregoing description, it is to be understood that certain changes in style, size and components may be effected without a departure from the spirit of the invention and within the scope of the appended claims.

Having described the invention, what is claimed as new is:

1. A convertible disc harrow comprising a draft bar, a pair of inner disc gangs operatively joined with said draft bar and projecting laterally beyond the respective sides of said draft bar, a pair of outer disc gangs provided with rigid bar means, a pair of rearwardly diverging brace bars pivotally connected at their forward ends with the leading end of said draft bar and separably connected at their rearward ends to the respective bar means on the respective outer disc gangs and positioning and retaining the latter each in axial alignment with the adjacent inner disc gang, arms joined with and projecting rearwardly from the respective outer ends of the inner disc gangs, arms joined with and projecting rearwardly from the respective inner ends of the outer disc gangs, vertical pivot means hingedly connecting the respective ends of the respective arms, whereby when the rear ends of said brace bars are detached from the bar means said outer disc gangs may be swung in horizontal planes rearwardly and inwardly into tandem relation with said inner disc gangs, said brace bars being swingable into parallel positions alongside of said draft bar, and means adapted to be carried by the rear ends of said brace bars for securing said outer gangs in said tandem relation, said means including a connecting frame operatively connectible with the respective adjacent ends of said outer disc gangs, said brace bars being connectible with said outer disc gangs at the ends opposite the hinged ends when said outer disc gangs are disposed in either position.

2. The combination of claim 1, said connecting frame including a pair of secondary brace bars connectible at their forward ends to said brace bars, and a connecting bar joining intermediate portions of said secondary brace bars, the rearward ends of said secondary bars being connectible with the adjacent ends of the bar means on the respective outer discs.

WAYNE A. SCOTT.

REFERENCES CITED

The following references are of record in the file of this patent:

UNITED STATES PATENTS

| Number | Name | Date |
|---|---|---|
| 2,002,272 | Mowry | May 21, 1935 |
| 2,052,302 | Johnson et al. | Aug. 25, 1936 |
| 2,094,144 | Curtis | Sept. 28, 1937 |
| 2,113,832 | Everett | Apr. 12, 1938 |
| 2,255,380 | Curtis | Sept. 9, 1941 |